United States Patent
Maeda et al.

(10) Patent No.: US 7,945,962 B2
(45) Date of Patent: May 17, 2011

(54) INFORMATION MEMORY APPARATUS USING PROBE

(75) Inventors: Takanori Maeda, Saitama (JP); Jun Suzuki, Saitama (JP); Atsushi Onoe, Saitama (JP); Hirokazu Takahashi, Saitama (JP); Kiyoshi Tateishi, Saitama (JP)

(73) Assignee: Pioneer Corporation, Tokyo (JP)

( * ) Notice: Subject to any disclaimer, the term of this patent is extended or adjusted under 35 U.S.C. 154(b) by 392 days.

(21) Appl. No.: 12/295,036

(22) PCT Filed: Mar. 30, 2007

(86) PCT No.: PCT/JP2007/057147
§ 371 (c)(1),
(2), (4) Date: Dec. 5, 2008

(87) PCT Pub. No.: WO2007/114355
PCT Pub. Date: Oct. 11, 2007

(65) Prior Publication Data
US 2009/0178168 A1 Jul. 9, 2009

(30) Foreign Application Priority Data
Mar. 31, 2006 (JP) ................................. 2006-099541

(51) Int. Cl.
*H01J 37/28* (2006.01)
(52) U.S. Cl. .................. 850/1; 850/2; 850/55; 369/126
(58) Field of Classification Search .................. 850/1, 2, 850/55; 369/126
See application file for complete search history.

(56) References Cited

U.S. PATENT DOCUMENTS

| 5,615,143 | A | * | 3/1997 | MacDonald et al. ......... 365/112 |
| 5,793,040 | A | * | 8/1998 | Oguchi et al. .................... 850/1 |
| 6,411,589 | B1 | | 6/2002 | Hoen et al. |
| 2003/0222430 | A1 | | 12/2003 | Walmsley et al. |

FOREIGN PATENT DOCUMENTS

| EP | 0 978 832 A | 2/2000 |
| JP | 5-126517 | 5/1993 |
| JP | 6-300513 | 10/1994 |
| WO | WO 03/100778 A | 12/2003 |

OTHER PUBLICATIONS

International Search Report for PCT/JP2007/057147 mailed Jul. 3, 2007.

* cited by examiner

*Primary Examiner* — Kiet T Nguyen
(74) *Attorney, Agent, or Firm* — Nixon & Vanderhye P.C.

(57) ABSTRACT

In a two-dimensional probe array, an interval between the leading ends of probes adjacent to each other in an X direction is made shorter than that between the leading ends of probes adjacent to each other in a Y direction. Thus, the leading ends of the probes are arranged to form a lattice wherein many rectangles are arranged. Furthermore, the lowest resonance frequency of an actuator which moves a recording medium in the X direction is set higher than the lowest resonance frequency of an actuator which moves the recording medium in the Y direction. At the time of recording or reading information, the recording medium is reciprocated in the X direction at a frequency substantially equal to the lowest resonance frequency of the actuator.

14 Claims, 7 Drawing Sheets

INFORMATION MEMORY APPARATUS USING PROBE

This application is the U.S. national phase of International Application No. PCT/JP2007/057147 filed 30 Mar. 2007 which designated the U.S. and claims priority to Japanese Patent Application No. 2006-099541 filed 31 Mar. 2006, the entire contents of each of which are hereby incorporated by reference.

TECHNICAL FIELD

The present invention relates to an information memory apparatus for recording or reading information with respect to a recording medium, using a probe, such as a scanning probe memory apparatus.

BACKGROUND ART

As a small-sized information memory apparatus which can record information highly densely, a scanning probe memory apparatus is listed.

The recording/reproducing principle of the scanning probe memory apparatus has various types: using a tunnel effect, using an atomic force, using a magnetic force, using an electrostatic force, using a non-linear dielectric constant, and using heat deformation of a recording medium.

The scanning probe memory apparatus is normally provided with: a probe having a tip with a radius of about several tens nanometers to several micrometers; and a plate-like (or flat) recording medium having a recording surface formed on its surface. The scanning probe memory apparatus brings the tip of the probe closer to or into contact with the recording surface of the recording medium, to thereby perform information recording or reading on the recording medium.

Moreover, the scanning probe memory apparatus displaces the probe or the recording medium in a parallel direction to the recording surface, to thereby change the position between the probe and the recording medium. By this, it is possible to scan the recording surface of the recording medium, using the probe, so that a large amount of information can be arranged on the recording surface, highly densely. Alternatively, the large amount of information arranged on the recording surface can be read, continuously or randomly. For such displacement of the probe or the recording medium, an electromagnetically-driven or electrostatically-driven actuator using e.g. a MEMS (Micro Electro Mechanical System) technology is used.

Moreover, most scanning probe memory apparatuses adopt a multi-probe method. That is, most scanning probe memory apparatuses are provided with: a two-dimensional probe head in which several tens, or several hundreds, or several thousands of probes are arranged in a matrix, for example. By using such a probe head, it is possible to quickly record the large amount of information into the recording medium, or it is possible to quickly read the large amount of information from the recording medium.

DISCLOSURE OF INVENTION

Subject to be Solved by the Invention

By the way, the two-dimensional probe array in the scanning probe memory apparatus generally has a matrix shape in which arrangement in a row direction is equal to arrangement in a column direction.

That is, the general two-dimensional probe array has k×k probes (k is an integer of 2 or more). With regard to the probes, k probes are arranged at even intervals in the row direction, and k probes are arranged at even intervals in the column direction. Moreover, the interval between the tips of the probes adjacent to each other in the row direction is equal to the interval between the tips of the probes adjacent to each other in the column direction.

That is, if a line is drawn in each of the row direction and the column direction to pass the tip of each probe, a grid is drawn in which many squares are arranged.

Now, in order to explain the subject of the present invention, one example of the general scanning probe memory apparatus is assumed. Hereinafter, this one example of the scanning probe memory apparatus is referred to as a "general model of the probe memory apparatus".

The general model of the probe memory apparatus is provided with: the two-dimensional probe array; the recording medium; a first actuator for displacing the recording medium in the row direction; and a second actuator for displacing the recording medium in the column direction.

The two-dimensional probe array has a probe support substrate to mount probes thereon. On the flat surface of the probe support substrate, 16×16 probes are arranged; namely, 16 probes are arranged at even intervals in the row direction, and 16 probes are arranged at even intervals in the column direction. Moreover, the interval between the tips of the probes adjacent to each other in the row direction is equal to the interval between the tips of the probes adjacent to each other in the column direction, and each of the intervals is 300 µm.

The recording medium has a recording area formed on the recording surface, and information is recorded into the recording area. Moreover, the recording area is a square, for example, on a side 4.8 mm in the external shape, and the recording area is divided into recording unit areas, each of which is a square on a side 300 µm. Moreover, one recording unit area is assigned to each probe of the two-dimensional array.

When the information is continuously recorded into the recording medium, firstly, the first actuator displaces the recording medium from the left to the right in the row direction by 300 µm. Then, the second actuator displaces the recording medium downward in the column direction by 1 µm. Then, the first actuator displaces the recording medium from the right to the left in the row direction by 300 µm. Then, the second actuator displaces the recording medium downward in the column direction by 1 µm. When the recording medium is displaced in the row direction, the information is recorded into the recording medium, by each probe. The general model of the probe memory apparatus repeats such an operation 150 times.

By this, in each recording unit area of the recording medium, the information is arranged on a line segment with a length of 300 µm extending in the row direction, and 300 information sequences as described above are formed in the column direction.

In the general model of the probe memory apparatus, the recording medium reciprocates a distance of 300 µm, 150 times, in the row direction, when the information is continuously recorded. The reciprocation is continuous and steady. On the other hand, when the same information is continuously recorded, the recording medium is displaced downward by 1 µm in the column direction each time. This displacement is intermittent.

By the way, the recording of the information on the probe memory apparatus is preferably high-speed. In order to speed up the information recording in the general model of the probe memory apparatus described above, it is preferable to speed up the displacement of the recording medium.

As one method of speeding up the displacement of the recording medium, it is considered to set a minimum resonance frequency of the actuator to be high.

However, depending on how to set the minimum resonance frequency of the actuator, an energy loss may increase and electricity consumption may increase.

In particular, the displacement in the row direction of the recording medium is the continuous reciprocation. Thus, there is a significant increase in the energy loss in the first actuator for displacing the recording medium in the row direction, and the electricity consumption significantly increases.

As another method of speeding up the displacement of the recording medium, it is considered to reduce the travel distance of the recording medium. For example, in the two-dimensional probe array of the general model of the probe memory apparatus described above, the interval between the tips of the probes adjacent to each other in the row direction and the interval between the tips of the probes adjacent to each other in the column direction are set to 60 µm. Then, the length of each side of the recording unit area of the recording medium is set to 60 µm. By this, the travel distance of the recording medium is 60 µm.

However, if such setting change is performed while the memory capacity of the probe memory apparatus is maintained, it is necessary to significantly increase the number of the probes. If the number of the probes is significantly increased, it is hard to ensure a space to mount the probes on the probe support substrate.

For example, in order to reduce a noise, it is necessary to dispose an initial amplifier for the probe, extremely close to the probe. For the purpose of this, the initial amplifier for the probe is desirably disposed with the probe on the probe support substrate of the probe array. If the number of the probes is significantly increased, it is hardly possible to ensure the space to mount the probes on the probe support substrate.

On the other hand, as described above, in the general model of the probe memory apparatus, when the information is continuously recorded, the recording medium reciprocates a relatively long distance continuously and steadily in the row direction, while travelling a relatively short distance intermittently in the column direction each time.

That is, a property in the displacement in the row direction of the recording medium is different from a property in the displacement in the column direction of the recording medium.

If so, in order to speed up the information recording or reading and to reduce the electricity consumption, it is desirable to make a mechanical property of the first actuator for displacing the recording medium in the row direction, different from a mechanical property of the second actuator for displacing the recording medium in the column direction, in accordance with a difference between the property in the displacement in the row direction of the recording medium and the property in the displacement in the column direction of the recording medium.

In view of the aforementioned problems, it is therefore a first object of the present invention to provide an information memory apparatus which can speed up the recording or reading of the information and which can reduce the electricity consumption.

It is a second object of the present invention to provide an information memory apparatus which can speed up the reciprocation of the recording medium or the probe array to perform the continuous recording or continuous reading of the information, and which can reduce electricity consumption of the actuator for reciprocating the recording medium or the probe array to perform the continuous recording or continuous reading of the information.

Means for Solving the Subject

The above object of the present invention can be achieved by a first information memory apparatus provided with: a plate-like recording medium having a recording surface; a probe array for recording or reading information with respect to the recording medium; a first actuator for displacing the recording medium in a first direction parallel to the recording surface; and a second actuator for displacing the recording medium in a second direction, which is parallel to the recording surface and which crosses the first direction, wherein the probe array provided with a probe support device and m×n probes (each of m and n is an integer of 2 or more), in the probes, m probes being arranged at even intervals along the first direction and n probes being arranged at even intervals along the second direction on the probe support device, and an interval between tips of the probes adjacent to each other in the first direction being shorter than an interval between tips of the probes adjacent to each other in the second direction.

The above object of the present invention can be also achieved by a second information memory apparatus provided with: a plate-like recording medium having a recording surface; a probe array for recording or reading information with respect to the recording medium; a first actuator for displacing the recording medium in a first direction parallel to the recording surface; and a second actuator for displacing the recording medium in a second direction, which is parallel to the recording surface and which crosses the first direction, wherein a mechanical minimum resonance frequency of the first actuator being higher than a mechanical minimum resonance frequency of the second actuator.

The above object of the present invention can be also achieved by a third information memory apparatus provided with: a plate-like recording medium having a recording surface; a probe array for recording or reading information with respect to the recording medium; a first actuator for displacing the probe array in a first direction parallel to the recording surface; and a second actuator for displacing the probe array in a second direction, which is parallel to the recording surface and which crosses the first direction, wherein the probe array provided with a probe support device and m×n probes (each of m and n is an integer of 2 or more), in the probes, m probes being arranged at even intervals along the first direction and n probes being arranged at even intervals along the second direction on the probe support device, and an interval between tips of the probes adjacent to each other in the first direction being shorter than an interval between tips of the probes adjacent to each other in the second direction.

The above object of the present invention can be also achieved by a fourth information memory apparatus provided with a plate-like recording medium having a recording surface; a probe array for recording or reading information with respect to the recording medium; a first actuator for displacing the probe array in a first direction parallel to the recording surface; and a second actuator for displacing the probe array in a second direction, which is parallel to the recording surface and which crosses the first direction, wherein a mechanical minimum resonance frequency of the first actuator being higher than a mechanical minimum resonance frequency of the second actuator.

These effects and other advantages of the present invention will become more apparent from the embodiments explained below.

DESCRIPTION OF REFERENCE CODES 1, 50 probe memory apparatus
13 recording medium
15 probe array
16 probe support substrate
17 probe
21, 24 actuator
22, 25, 51 spring structure

BEST MODE FOR CARRYING OUT THE INVENTION

Hereinafter, the best mode for carrying out the invention will be explained in each embodiment in order, with reference to the drawings.

Figure 1:
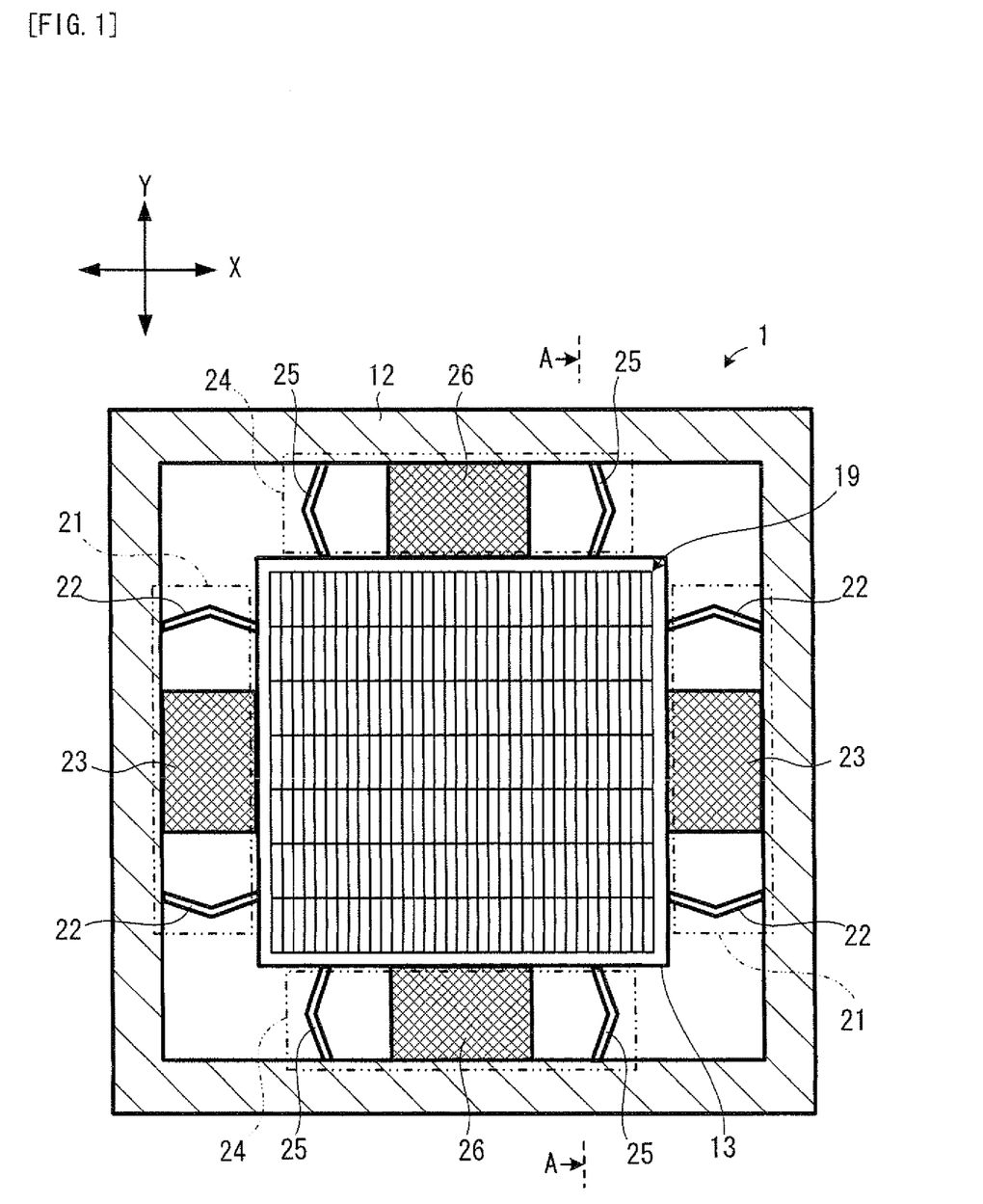
FIG. 1 is a plan view showing a scanning probe memory apparatus in an embodiment of the information memory apparatus of the present invention.
Figure 2:
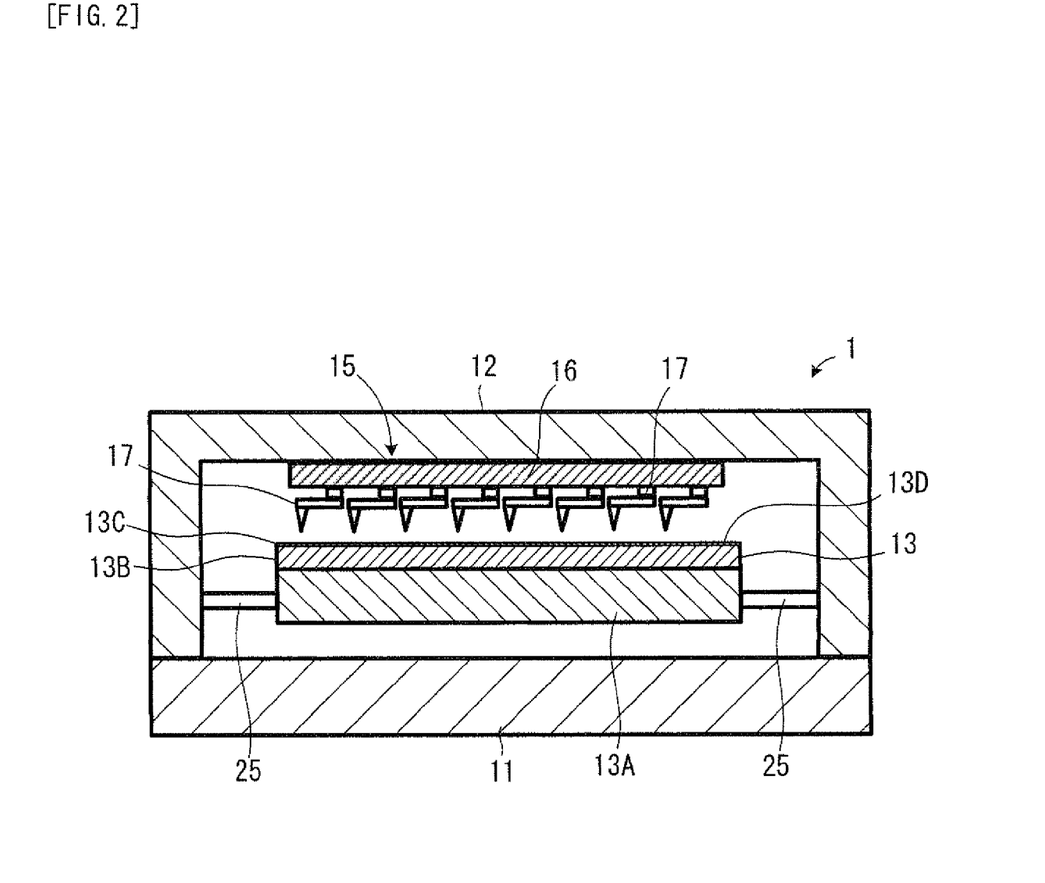
FIG. 2 is a cross sectional view showing the scanning probe memory apparatus in FIG. 1, viewed from an arrow A-A direction.

FIG. 1 shows a scanning probe memory apparatus in an embodiment of the information memory apparatus of the present invention. FIG. 2 shows a cross section of the scanning probe memory apparatus in FIG. 1, viewed from an arrow A-A direction.

A scanning probe memory apparatus 1 in FIG. 1 is a small-sized apparatus, for example, which is several millimeters to several centimeters in length and in width (length in a horizontal direction and a vertical direction in FIG. 1) and which is several millimeters in thickness (length in a vertical direction in FIG. 2), in external dimension.

The scanning probe memory apparatus 1 can record information onto a recording surface 13D of a recording medium 13 highly densely, using probes 17, and has a huge memory capacity regardless of its small size. For example, the memory capacity is several tens to several hundreds gigabytes, and can also exceed a terabyte.

The probe memory apparatus 1 records the information using the spontaneous polarization of a ferroelectric substance. That is, the tips of the probes 17 are brought closer to or into contact with the recording surface 13D of the recording medium 13, which has a recording layer 13C formed of a ferroelectric material, and a voltage exceeding a coercive electric field of the ferroelectric substance is applied through the probes 17. By this, the polarization direction of the ferroelectric substance is changed, to thereby record the information. Moreover, the reading of the information recorded in the recording medium 13 is performed by a SNDM (Scanning Nonlinear Dielectric Microscopy) method.

Moreover, the probe memory apparatus 1 is provided with electromagnetically-driven actuators 21 and 24, and the drive of the actuators 21 and 24 allows the recording medium 13 to be displaced in a parallel direction to the recording surface 13D. On the other hand, the probes 17 are fixed on a housing 12. By this, it is possible to change the relative position between the probes 17 and the recording medium 13, to thereby scan the recording surface 13D by using the probes 17.

Moreover, the probe memory apparatus 1 is provided with a two-dimensional probe array 15 in which 80×16 (=1280) probes 17 are arranged. By this, it is possible to quickly record a large amount of information onto the recording surface 13D, or to quickly read a large amount of information from the recording surface 13D.

As shown in FIG. 2, the probe memory apparatus 1 has a plate-like housing 11 disposed in the lower portion and the cup-shaped housing 12 disposed in the upper portion. There is a space formed between the housing 11 and the housing 12.

In the space formed between the housing 11 and the housing 12, the recording medium 13 is disposed. There is also a vacant space or gap between the lower surface of the recording medium 13 and the upper surface of the housing 11. Moreover, there is also a vacant space or gap between the upper surface of the recording medium 13 and the lower surface of the housing 12. Moreover, each side surface of the recording medium 13 is away from each inner side surface of the housing 12 facing the side surface of the recording medium 13.

The recording medium 13 is connected to the housing 12 by eight spring structures 22 and 25, as shown in FIG. 1.

The recording medium 13 is provided with: a substrate 13A; an electrode 13B; and the recording layer 13C, as shown in FIG. 2. The upper surface of the recording layer 13C is the recording surface 13D. The substrate 13A is plate-like, and is formed of $SiO_2$, for example. The electrode 13B is formed of copper, for example. The recording layer 13C is formed of a ferroelectric material, such as $LiTaO_3$ or $LiNbO_3$. Each of the recording layer 13C and the electrode 13B is desirably a thin layer with a thickness of 1 µm or less. Considering that one portion of the actuators 21 and 24 is mounted on each side surface of the substrate 13A and that the strength of the recording medium 13 is ensured, the substrate 13A has a thickness of about 500 µm to 1 mm, for example.

The recording medium 13 has a recording area formed on the recording surface 13D, and information is recorded into the recording area. Moreover, the recording area is a square, for example, on a side 4.8 mm in the external shape. Moreover, the recording area is virtually divided into 1280 recording unit areas. Each recording unit area is a rectangle; for example, the length of each short side extending in an X direction is 60 µm, and the length of each long side extending in a Y direction is 300 µm. One probe 17 is assigned to each recording unit area of the recording medium 13.

Moreover, in the space formed between the housing 11 and the housing 12, the two-dimensional probe array 15 is disposed. The two-dimensional probe array 15 is disposed above the recording medium 13, and performs the information recording or reading on the recording surface 13D.

The probe array 15 is provided with: a probe support substrate 16; and the 80×16 probes 17. The tip diameter of each probe 17 is about 50 nm, for example.

The probes 17 are provided on the flat surface of the probe support substrate 16; namely, 80 probes are arranged at even intervals along the X direction, and 16 probes are arranged at even intervals along the Y direction. The X direction is a parallel direction to the recording surface 13D, and the Y direction is parallel to the recording surface 13D and crosses the X direction at almost right angles.

Figure 3:
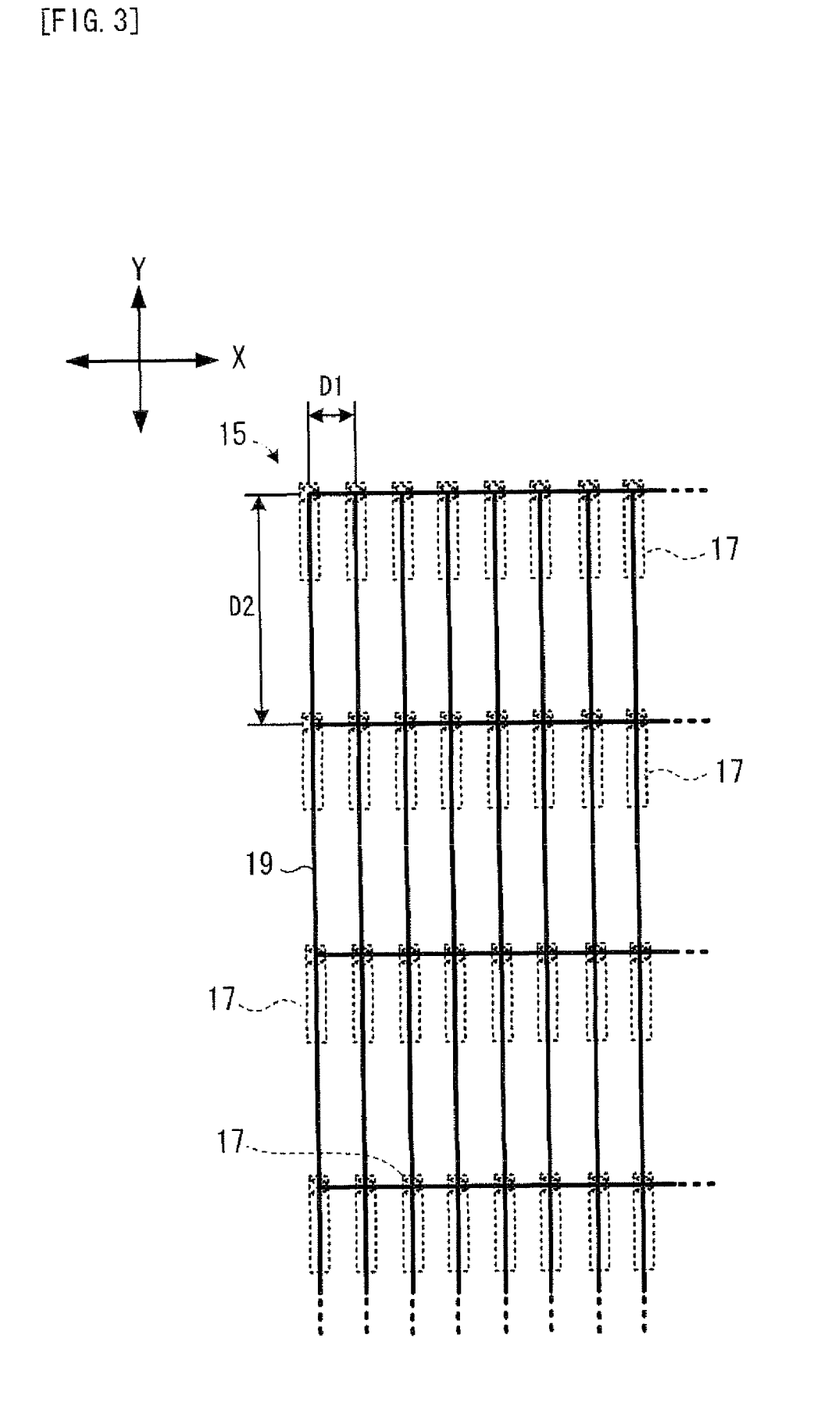
FIG. 3 is an explanatory diagram showing the arrangement of tips of probes of the scanning probe memory apparatus in FIG. 1.

Moreover, as shown in FIG. 3, an interval D1 between the tips of the probes 17 adjacent to each other in the X direction is shorter than an interval D2 between the tips of the probes 17 adjacent to each other in the Y direction. For example, the interval D1 is 60 μm, and the interval D2 is 300 μm.

If a line is drawn in each of the X direction and the Y direction to pass the tip of each probe 17, a grid 19 is drawn in which many rectangles are arranged. That is, the tip of each probe 17 is disposed to draw the grid 19 in which many rectangles are arranged.

Incidentally, the grid 19 shown in FIG. 1 is schematic, and this does not show the correct arrangement of the tips of the probes 17. Moreover, the probes 17 in FIG. 2 are also schematic, and FIG. 2 does not show the correct number of the probes 17.

Moreover, in the space formed between the housing 11 and the housing 12, two first actuators 21 and two second actuators 24 are disposed.

The first actuators 21 displace the recording medium 13 in the X direction. As shown in FIG. 1, one of the first actuators 21 is located on the left side of the recording medium 13 and is disposed between the recording medium 13 and the housing 12. The other first actuator 21 is located on the right side of the recording medium 13 and is disposed between the recording medium 13 and the housing 12.

Each of the first actuators 21 is provided with: two springs structures 22; and a driving device 23.

Each spring structure 22 is connected to the housing 12 in the condition that the recording medium 13 can be displaced in the X direction. One end of each spring structure 22 is connected to the side surface of the substrate 13A of the recording medium 13, and the other end of each spring structure 22 is connected to the inner side surface of the housing 12. Each spring structure 22 is formed by processing a silicon material in a predetermined shape, for example. Each spring structure 22 is formed to be deformed with a predetermined spring constant, at least in the X direction.

Figure 4:
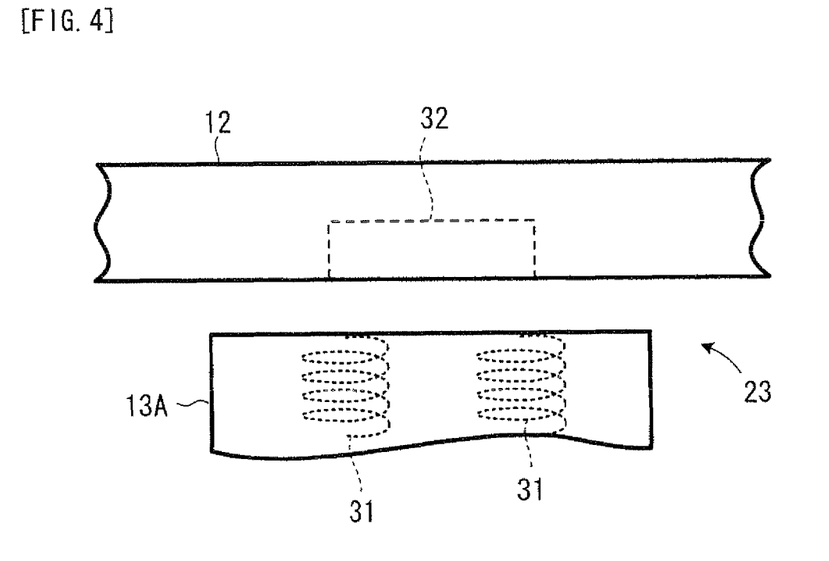
FIG. 4 is a plan view showing a specific structure of a driving device of an actuator.

The driving device 23 is provided with an electromagnetically-driven driving mechanism as shown in FIG. 4, for example. That is, coil wirings 31 are embedded in the side surface of the substrate 13S of the recording medium 13, and a permanent magnet 32 is embedded in the inner side surface of the housing 12. The driving device 23 uses a magnetic force generated by applying an electric current to the coil wirings 31 and displaces the recording medium 13 in the X direction against each spring structure 22.

Figure 5:
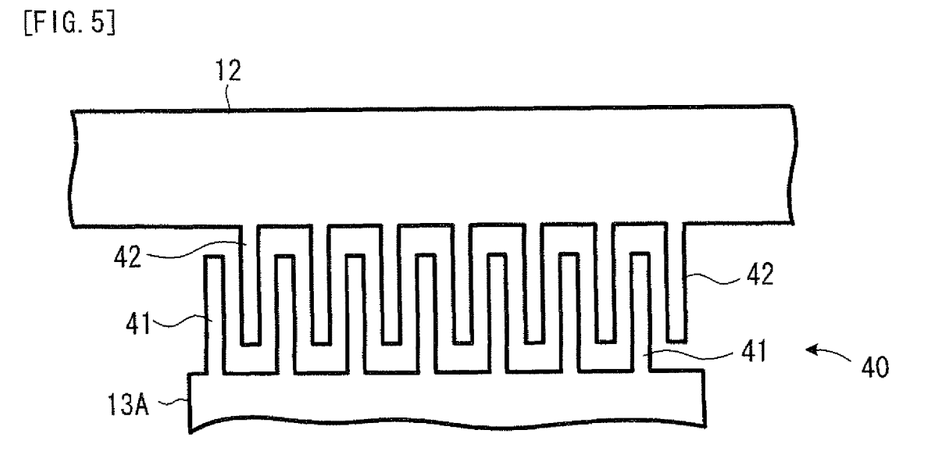
FIG. 5 is a plan view showing another structure of the driving device of the actuator.

Incidentally, as the driving device of the first actuator 21, not the electromagnetically-driven driving mechanism but an electrostatically-driven driving mechanism may be used. In this case, as shown in a driving device 40 shown in FIG. 5, for example, comb tooth electrodes 41 are formed on the side surface of the substrate 13A of the recording medium 13, and comb tooth electrodes 42 are formed on the inner side surface of the housing 12. Then, the comb tooth electrodes 41 and the comb tooth electrodes 42 are arranged to engage each other through a vacant space. The driving device 40 forms an electric field between the comb tooth electrodes 41 and 42, and uses an electrostatic force generated by the electric field, to thereby displace the recording medium 13 in the X direction against each spring structure 22. Moreover, as the driving device of the first actuator 21, a piezoelectrically-driven driving mechanism using a piezoelectric material or the like may be adopted.

The second actuators 24 displace the recording medium 13 in the Y direction. As shown in FIG. 1, one of the second actuators 21 is located on the upper side of the recording medium 13 and is disposed between the recording medium 13 and the housing 12. The other second actuator 24 is located on the lower side of the recording medium 13 and is disposed between the recording medium 13 and the housing 12.

Each of the second actuators 24 is provided with: two springs structures 25; and a driving device 26.

Each spring structure 25 is connected to the housing 12 in the condition that the recording medium 13 can be displaced in the Y direction. One end of each spring structure 25 is connected to the side surface of the substrate 13A of the recording medium 13, and the other end of each spring structure 25 is connected to the inner side surface of the housing 12. Each spring structure 25 is formed by processing a silicon material in a predetermined shape, for example. Each spring structure 25 is formed to be deformed with a predetermined spring constant, at least in the Y direction.

The driving device 26 has substantially the same structure as that of the driving device 23, and is provided with an electromagnetically-driven driving mechanism as shown in FIG. 4, for example. Incidentally, as the driving device of the second actuator 24, not the electromagnetically-driven driving mechanism but an electrostatically-driven driving mechanism shown in FIG. 5 or a piezoelectrically-driven driving mechanism may be used.

Figure 6:
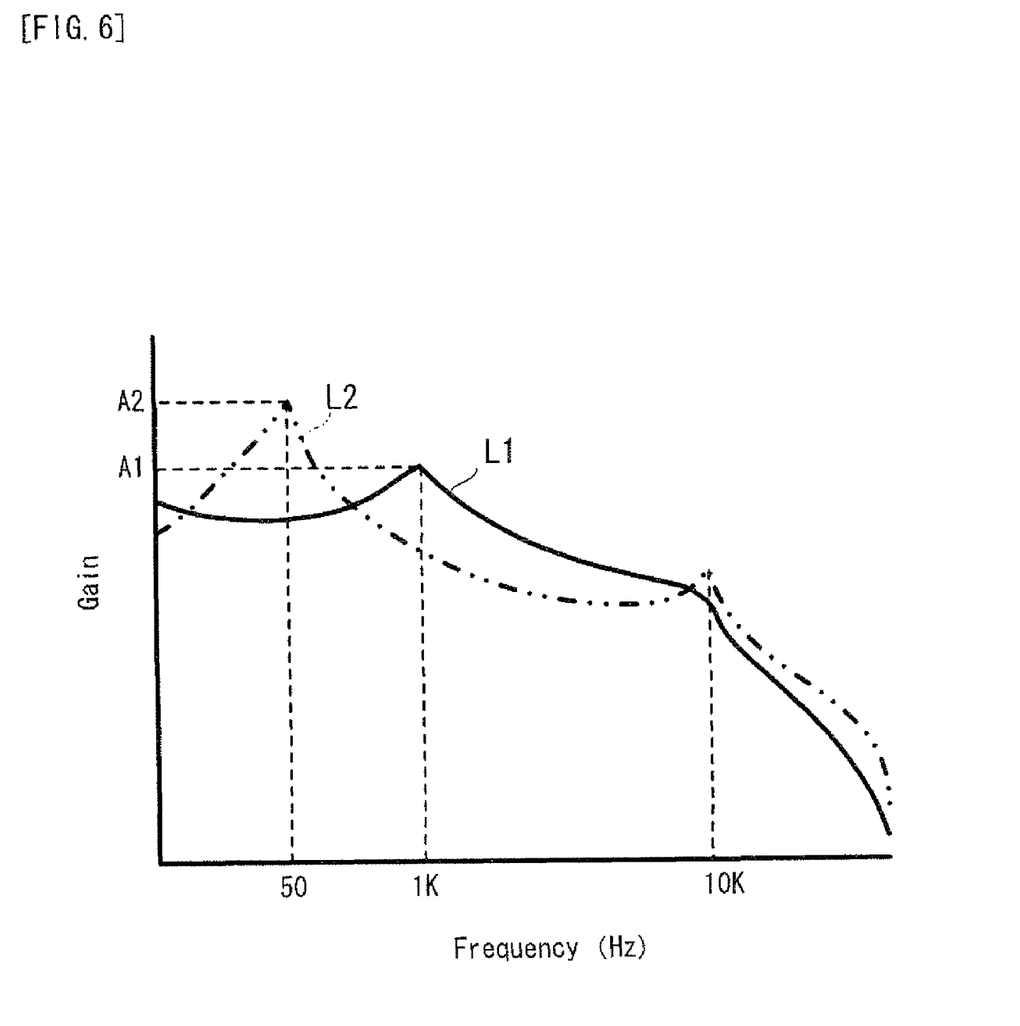
FIG. 6 is a graph showing a property of the actuator of the scanning probe memory apparatus in FIG. 1.

FIG. 6 shows a frequency-gain property of each of the first actuator 21 and the second actuator 22. The horizontal axis of the graph in FIG. 6 indicates a frequency, and the vertical axis indicates a gain. Moreover, a properly line L1 in FIG. 6 indicates the property of each first actuator 21, and a properly line L2 indicates the property of each second actuator 22.

As shown in FIG. 6, the mechanical minimum resonance frequency (mechanical first-order resonance frequency) of the first actuator 21 is about 1 kHz. The gain of the first actuator 21 has a maximum value A1 at the minimum resonance frequency. The minimum resonance frequency of the first actuator 21 can be determined, mainly by properly setting the spring constant in the X direction of each spring structure 22.

On the other hand, the mechanical minimum resonance frequency of the second actuator 24 is about 50 Hz. The gain of the second actuator 24 has a maximum value A2 at the minimum resonance frequency. The minimum resonance frequency of the second actuator 24 can be determined, mainly by properly setting the spring constant in the Y direction of each spring structure 25.

As shown in FIG. 6, the mechanical minimum resonance frequency of the first actuator 21 is higher than the mechanical minimum resonance frequency of the second actuator 24. Moreover, the spring constant in the X direction of the spring structure 22 in the first actuator 21 is greater than the spring constant in the Y direction of the spring structure 25 in the second actuator 24. That is, roughly speaking, the spring structure 22 is harder than the spring structure 25.

Figure 7:
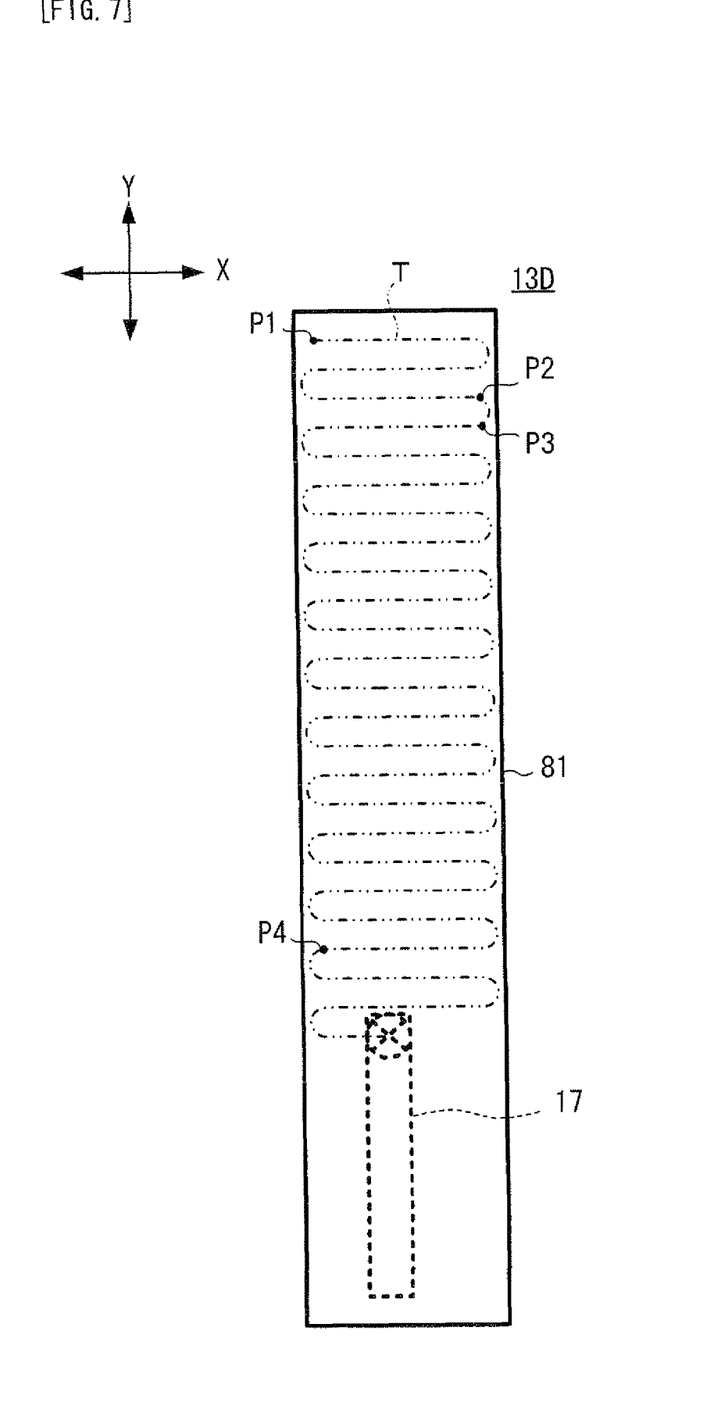
FIG. 7 is an explanatory diagram showing the information recording operation of the scanning probe memory apparatus in FIG. 1.

FIG. 7 shows the information recording operation of the probe memory apparatus 1.

As shown in FIG. 7, when continuously the information onto the recording surface 13D of the recording medium 13, the probe memory apparatus 1 disposes the tip of each probe 17 above a position P1 in the recording unit area 81 assigned to the probe 17, for example. Then, the probe memory apparatus 1 brings the tip of each probe 17 closer to or into contact with the recording surface 13D. Then, the probe memory apparatus 1 drives each first actuator 21 and each second actuator 24.

Firstly, by the drive of each first actuator 21, the recording medium 13 is displaced by about 60 μm from the left to the right in the X direction. Then, by the drive of each second actuator 24, the recording medium 13 is displaced by about 1 μm downward in the Y direction. Then, by the drive of each first actuator 21, the recording medium 13 is displaced by about 60 μm from the right to the left in the X direction. Then, by the drive of each second actuator 24, the recording medium 13 is displaced by about 1 μm downward in the Y direction. When the recording medium 13 is displaced in the X direction, the probe memory apparatus 1 applies a voltage exceeding a coercive electric field of the ferroelectric substance to each probe 17, to thereby record the information into the recording layer 13C. The probe memory apparatus 1 repeats such an operation 150 times.

A two-dot chain line T in FIG. 7 indicates a trajectory of the tip of the probe 17, generated by the displacement of the recording medium 13 described above. Incidentally, the two-dot chain line T is schematic, and the interval in the vertical direction of a linear portion extending in the horizontal direction in the two-dot chain line T is not correct. The actual interval is narrower than this.

By the information recording operation of the probe memory apparatus 1 described above, the information is arranged on the linear segment with a length of about 60 μm extending in the X direction and 300 information sequences as described above are formed in the Y direction, in each recording unit area 81.

In the information recording operation of the probe memory apparatus 1, each first actuator 21 oscillates the recording medium 13 in the X direction at a frequency substantially equal to the mechanical minimum resonance frequency of the first actuator 21. By this, the recording medium 13 reciprocates a distance of about 60 μm in the X direction.

In determining the mechanical minimum resonance frequency of each first actuator 21 or the spring constant of the spring structure 22, it is considered that the travel distance (stroke) in the X direction of the recording medium 13 is 60 μm. Desirably, the mechanical minimum resonance frequency of each first actuator 21 or the spring constant of the spring structure 22 is determined such that the travel distance (stroke) in the X direction of the recording medium 13 is 60 μm.

On the other hand, in the information recording operation of the probe memory apparatus 1, each second actuator 24 oscillates the recording medium 13 in the Y direction at a frequency higher than the mechanical minimum resonance frequency of the second actuator 24. For example, each second actuator 24 displaces the recording medium 13 in the Y direction at a frequency within a range of a first-order resonance frequency to a second-order resonance frequency (e.g. 10 kHz) of the second actuator 24.

As explained above, the probes 17 of the probe memory apparatus 1 are provided on the probe support substrate 16 such that the 80 probes are arranged at even intervals along the X direction and that the 16 probes are arranged at even intervals along the Y direction. Then, the interval between the tips of the probes 17 adjacent to each other in the X direction is shorter than the interval between the tips of the probes 17 adjacent to each other in the Y direction. That is, if a line is drawn in each of the X direction and the Y direction to pass the tip of each probe 17, the grid 19 is drawn in which many rectangles are arranged, as shown in FIG. 3.

By reducing the interval between the tips of the probes 17 adjacent to each other in the X direction, it is possible to reduce the travel distance of the recording medium 13 in the X direction. By this, it is easy to speed up the moving speed of the recording medium 13 in the X direction. Therefore, it is easy to speed up the reciprocation of the recording medium 13 to perform the continuous recording or continuous reading of the information.

Moreover, in the probe memory apparatus 1, the minimum resonance frequency of the first actuator 21 is set to be high, and the recording medium 13 is reciprocated in the X direction at the frequency substantially equal to this minimum resonance frequency. By this, it is possible to speed up the reciprocation of the recording medium 13 in the X direction, and it is also possible to substantially minimize the energy of the first actuator 21 to be consumed for the reciprocation. That is, it is possible to reduce the electricity consumption of the first actuator 21.

Therefore, according to the probe memory apparatus 1, it is possible to reduce the electricity consumption while speeding up the information recording or reading.

Moreover, in the probe memory apparatus 1, the minimum resonance frequency of the first actuator 21 is higher than the minimum resonance frequency of the second actuator 24. By this, it is possible to make the mechanical property of the first actuator 21, different from the mechanical property of the second actuator 24, in accordance with the difference between the property in the displacement in the X direction of the recording medium 13 and the property in the displacement in the Y direction of the recording medium 13, so that it is possible to increase the displacement performance in the X direction and the Y direction of the recording medium 13. Thus, it is possible to increase the speed and accuracy of the recording or reading of the information and to reduce the electricity consumption.

That is, in the continuous recording or continuous reading of the information, the recording medium 13 reciprocates in the X direction. The reciprocation of the recording medium 13 is continuous and steady. Moreover, the reciprocation is performed at a constant and relatively short distance (e.g. 60 μm).

In the probe memory apparatus 1, the minimum resonance frequency of the first actuator 21 is set to be relatively high, and the recording medium 13 is reciprocated at the frequency substantially equal to the minimum resonance frequency, by which it is possible to reciprocate the recording medium 13 at high speed and moreover, it is possible to substantially minimize the electric power to be consumed for the reciprocation.

On the other hand, in performing a track shift to perform the continuous information recording or continuous information recording, the recording medium 13 travels an extremely short distance (e.g. 1 μm) in the Y direction. Moreover, in performing tracking servo control, in some cases, the recording medium 13 travels a further extremely short distance (e.g. several tens nm) in the Y direction. Moreover, in performing a track jump, the recording medium 13 travels a long distance (e.g. 200 μm) in the Y direction. As described above, there are various long and short travel distances in the Y direction of the recording medium 13. Moreover, in any case of the track shift, the tracking servo control, and the track jump, the displacement of the recording medium 13 is intermittent or temporal. Moreover, in any case of the track shift, the tracking servo control, and the track jump, it is necessary to perform positioning after the displacement of the recording medium 13, highly accurately.

In the probe memory apparatus 1, the minimum resonance frequency of the second actuator 24 is set to be relatively low and the recording medium 13 is reciprocated at the frequency higher than the minimum resonance frequency. By this, it is possible to perform the various long and short displacements of the recording medium 13, highly accurately, in the track shift, the tracking servo control, and the track jump.

Moreover, in the probe memory apparatus 1, the first actuator 21 is provided with the spring structures 22. Moreover, the second actuator 24 is provided with the spring structures 25. Moreover, the spring constant of the spring structure 22 is greater than the spring constant of the spring structure 25.

By this, it is possible to set the minimum resonance frequency of the first actuator 21 to be higher than the minimum resonance frequency of the second actuator 24. Therefore, it is possible to make the mechanical property of the first actuator 21, different from the mechanical property of the second actuator 24, in accordance with the difference between the property in the displacement in the X direction of the recording medium 13 and the property in the displacement in the Y direction of the recording medium 13, so that it is possible to increase the displacement performance in the X direction and the Y direction of the recording medium 13. Thus, it is possible to increase the speed and accuracy of the recording or reading of the information and to reduce the electricity consumption.

Incidentally, the probe memory apparatus 1 reciprocates the recording medium 13 at the frequency substantially equal to the minimum resonance frequency of the first actuator 21. The present invention, however, is not limited to this. The probe memory apparatus 1 may reciprocate the recording medium 13 at a frequency lower than the minimum resonance frequency of the first actuator 21. By this, it is possible to improve the controllability (degree of freedom or accuracy of the control) in the displacement in the X direction of the recording medium 13.

That is, if the recording medium 13 is reciprocated at the frequency substantially equal to the minimum resonance frequency of the first actuator 21, the oscillation of the recording medium 13 is in the resonance condition. On the other hand, if the recording medium 13 is reciprocated at the frequency lower than the minimum resonance frequency of the first actuator 21, the oscillation of the recording medium 13 is not in the resonance condition. The controllability in the displacement in the X direction of the recording medium 13 is better if the oscillation of the recording medium 13 is not in the resonance condition than if it is in the resonance condition. Therefore, by reciprocating the recording medium 13 at the frequency lower than the minimum resonance frequency of the first actuator 21, it is possible to improve the controllability in the displacement in the X direction of the recording medium 13.

Moreover, as shown by the property line L1 in FIG. 6, is a comparison is made between the case where the recording medium 13 is reciprocated at the frequency lower than the minimum resonance frequency of the first actuator 21 and the case where the recording medium 13 is reciprocated at the frequency higher than the minimum resonance frequency of the first actuator 21, the electric consumption is smaller in the former case than in the latter case. Therefore, by reciprocating the recording medium 13 at the frequency lower than the minimum resonance frequency of the first actuator 21, it is possible to reduce the electricity consumption while improving the controllability in the displacement in the X direction of the recording medium 13.

Moreover, as shown in FIG. 3, in the probe memory apparatus 1, by connecting the tip position of each probe 17, it is possible to draw the grid 19 in which many rectangles are arranged. However, the arrangement of the tip of each probe 17 is not limited to this. If the X direction and the Y direction cross at an angle greater than 0 degrees and smaller than 90 degrees in the flat surface parallel to the recording medium 13D, a graphic which constitutes a grid drawn by the tip of each probe 17 is not necessarily the rectangle but a parallelogram which is elongated in a longitudinal direction (Y direction). The present invention may adopt this.

Moreover, as shown in FIG. 3, in the probe memory apparatus 1, a ratio of the interval between the tips of the probes 17 adjacent to each other in the X direction with respect to the interval between the tips of the probes 17 adjacent to each other in the Y direction is 1:5. However, the ratio is not limited to this. The ratio may be 1:2, 1:4, 1:8, or 1:16.

Moreover, the probe memory apparatus 1 realizes the scanning of the recording surface 13D by the probes 17, by displacing the recording medium 13 in the parallel direction to the recording surface 13D. The present invention, however, is not limited to this. Like the probe memory apparatus 50 shown in FIG. 8, the scanning of the recording surface 13D by the probes 17 may be realized by displacing the probe array 16 in the parallel direction to the recording surface 13D.

Figure 8:
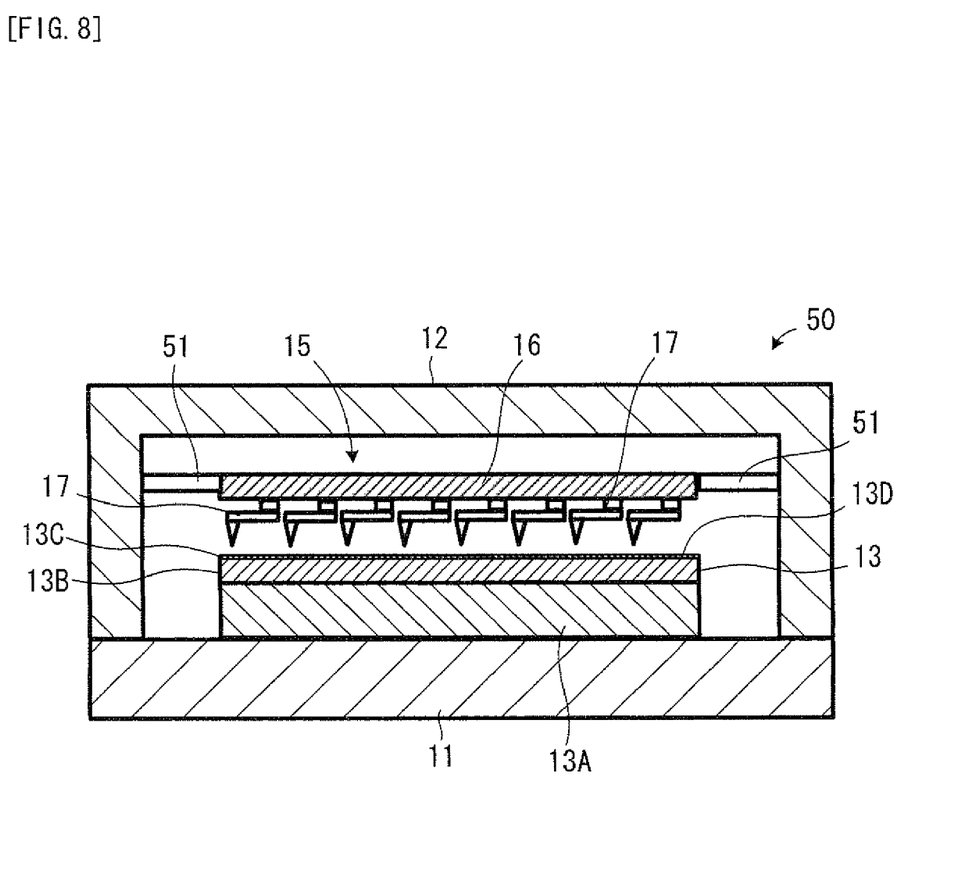
FIG. 8 is a cross sectional view showing a scanning probe memory apparatus in another embodiment of the information memory apparatus of the present invention.

In this case, the recording medium 13 is fixed to the housing 11, and the probe array 15 is connected to the housing 12 by spring structures 51 or the like in the condition that the probe array 15 can be displaced in the parallel direction to the recording surface 13D. Then, the first actuator for displacing the probe array in the X direction and the second actuator for displacing the probe array 15 in the Y direction are provided. The mechanical minimum resonance frequency and the spring constant of the first actuator and the second actuator may be substantially the same as those of the first actuator 21 and the second actuator 24 of the probe memory apparatus 1 in FIG. 1.

In the probe memory apparatus 50, when the information is continuously recorded into the recording medium 13, the probe array 15 reciprocates a constant distance (e.g. 60 μm) at high speed in the X direction by the drive of the first actuator. Moreover, the probe array 15 is displaced highly accurately at various long and short distances in the Y direction, by the drive of the second actuator in accordance with the operation of the track shift, the tracking servo control, or the track jump.

Moreover, the probe memory apparatus 1 adopts the method of applying a voltage to the recording layer 13C formed of the ferroelectric material, to thereby record the information. The present invention, however, is not limited to this. The present invention can be also applied to a scanning probe memory apparatus which adopts a recording method using a tunnel effect, using an atomic force, using a magnetic force, using an electrostatic force, using a nonlinear dielectric constant, or using heat deformation of a recording medium.

Moreover, in the present invention, various changes may be made, if desired, without departing from the essence or spirit of the invention which can be read from the claims and the entire specification. An information memory apparatus, which involves such changes, is also intended to be within the technical scope of the present invention.

INDUSTRIAL APPLICABILITY

The information memory apparatus using the probe according to the present invention can be applied to an information memory apparatus for recording or reading information with respect to a recording medium, using a probe, such as a scanning probe memory apparatus.

The invention claimed is:

1. An information memory apparatus comprising:
   a plate-like recording medium having a recording surface;
   a probe array for recording or reading information with respect to said recording medium;
   a first actuator for displacing said recording medium in a first direction parallel to the recording surface; and
   a second actuator for displacing said recording medium in a second direction, which is parallel to the recording surface and which crosses the first direction,
   wherein said probe array comprising a probe support device and m×n probes (each of m and n is an integer of 2 or more),
   in the probes, m probes being arranged at even intervals along the first direction and n probes being arranged at even intervals along the second direction on the probe support device, and
   an interval between tips of the probes adjacent to each other in the first direction being shorter than an interval between tips of the probes adjacent to each other in the second direction, and
   a mechanical minimum resonance frequency of said first actuator being different from a mechanical minimum resonance frequency of said second actuator.

2. The information memory apparatus according to claim 1, wherein a mechanical minimum resonance frequency of said first actuator is higher than a mechanical minimum resonance frequency of said second actuator.

3. The information memory apparatus according to claim 1, wherein
   said first actuator comprises a first spring structure for connecting said recording medium to a housing in such a condition that said recording medium can be displaced in the first direction,
   said second actuator comprises a second spring structure for connecting said recording medium to the housing in such a condition that said recording medium can be displaced in the second direction, and
   a spring constant of the first spring structure is greater than a spring constant of the second spring structure.

4. An information memory apparatus comprising:
   a plate-like recording medium having a recording surface;
   a probe array for recording or reading information with respect to said recording medium;
   a first actuator for displacing said recording medium in a first direction parallel to the recording surface; and
   a second actuator for displacing said recording medium in a second direction, which is parallel to the recording surface and which crosses the first direction,
   wherein a mechanical minimum resonance frequency of said first actuator being higher than a mechanical minimum resonance frequency of said second actuator.

5. The information memory apparatus according to claim 4, wherein when the information is recorded or read with respect to said recording medium, said first actuator reciprocates said recording medium at a frequency substantially equal to the mechanical minimum resonance frequency of said first actuator.

6. The information memory apparatus according to claim 4, wherein when the information is recorded or read with respect to said recording medium, said first actuator reciprocates said recording medium at a frequency not exceeding the mechanical minimum resonance frequency of said first actuator.

7. The information memory apparatus according to claim 4, wherein
   said first actuator comprises a first spring structure for connecting said recording medium to a housing in such a condition that said recording medium can be displaced in the first direction,
   said second actuator comprises a second spring structure for connecting said recording medium to the housing in such a condition that said recording medium can be displaced in the second direction, and
   a spring constant of the first spring structure is greater than a spring constant of the second spring structure.

8. An information memory apparatus comprising:
   a plate-like recording medium having a recording surface;
   a probe array for recording or reading information with respect to said recording medium;
   a first actuator for displacing said probe array in a first direction parallel to the recording surface; and
   a second actuator for displacing said probe array in a second direction, which is parallel to the recording surface and which crosses the first direction,
   wherein said probe array comprising a probe support device and m×n probes (each of m and n is an integer of 2 or more),
   in the probes, m probes being arranged at even intervals along the first direction and n probes being arranged at even intervals along the second direction on the probe support device, and
   an interval between tips of the probes adjacent to each other in the first direction being shorter than an interval between tips of the probes adjacent to each other in the second direction, and
   a mechanical minimum resonance frequency of said first actuator being different from a mechanical minimum resonance frequency of said second actuator.

9. The information memory apparatus according to claim 8, wherein a mechanical minimum resonance frequency of said first actuator is higher than a mechanical minimum resonance frequency of said second actuator.

10. The information memory apparatus according to claim 8, wherein
    said first actuator comprises a first spring structure for connecting said probe array to a housing in such a condition that said probe array can be displaced in the first direction,
    said second actuator comprises a second spring structure for connecting said probe array to the housing in such a condition that said probe array can be displaced in the second direction, and
    a spring constant of the first spring structure is greater than a spring constant of the second spring structure.

11. An information memory apparatus comprising:
    a plate-like recording medium having a recording surface;
    a probe array for recording or reading information with respect to said recording medium;
    a first actuator for displacing said probe array in a first direction parallel to the recording surface; and
    a second actuator for displacing said probe array in a second direction, which is parallel to the recording surface and which crosses the first direction,
    wherein a mechanical minimum resonance frequency of said first actuator being higher than a mechanical minimum resonance frequency of said second actuator.

12. The information memory apparatus according to claim 11, wherein when the information is recorded or read with respect to said recording medium, said first actuator reciprocates said probe array at a frequency substantially equal to the mechanical minimum resonance frequency of said first actuator.

13. The information memory apparatus according to claim 11, wherein when the information is recorded or read with respect to said recording medium, said first actuator reciprocates said probe array at a frequency not exceeding the mechanical minimum resonance frequency of said first actuator.

14. The information memory apparatus according to claim 11, wherein
said first actuator comprises a first spring structure for connecting said probe array to a housing in such a condition that said probe array can be displaced in the first direction,
said second actuator comprises a second spring structure for connecting said probe array to the housing in such a condition that said probe array can be displaced in the second direction, and
a spring constant of the first spring structure is greater than a spring constant of the second spring structure.

\* \* \* \* \*